United States Patent
Megumi et al.

(10) Patent No.: US 8,187,564 B2
(45) Date of Patent: May 29, 2012

(54) PROCESS FOR PRODUCING BORON ADDED PURIFIED SILICON

(75) Inventors: Tomohiro Megumi, Niihama (JP); Hiroshi Tabuchi, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 76 days.

(21) Appl. No.: 12/371,178

(22) Filed: Feb. 13, 2009

(65) Prior Publication Data
US 2009/0208401 A1 Aug. 20, 2009

(30) Foreign Application Priority Data
Feb. 15, 2008 (JP) .................................. 2008-034303

(51) Int. Cl.
*C01B 33/02* (2006.01)
(52) U.S. Cl. ........... 423/350; 423/348; 75/331; 136/291
(58) Field of Classification Search .................... 75/331; 423/348–350, 495, DIG. 10, DIG. 12; 136/261
See application file for complete search history.

(56) References Cited

U.S. PATENT DOCUMENTS

| 4,138,509 A * | 2/1979 | Ingle et al. ..................... 423/349 |
| 4,919,913 A | 4/1990 | Kurz et al. |
| 6,013,872 A * | 1/2000 | Woditsch et al. ............. 136/255 |
| 2008/0274031 A1* | 11/2008 | Ito et al. ........................ 423/350 |

FOREIGN PATENT DOCUMENTS

| JP | 2-64006 A | 3/1990 |
| JP | 2007-39318 A | 2/2007 |

* cited by examiner

*Primary Examiner* — Stuart Hendrickson
*Assistant Examiner* — Richard M Rump
(74) *Attorney, Agent, or Firm* — Birch, Stewart, Kolasch & Birch, LLP

(57) ABSTRACT

Provided is a process for producing a boron added silicon (purified silicon) in an energy saving mode from a reduced silicon obtained by reducing a silicon halide with a metal aluminium. The production process of the invention comprises reducing a silicon halide with a metal aluminium to give a reduces silicon, heating and melting the resulting reduced silicon, and adding boron thereto followed by solidification for purification under the condition of a temperature gradient provided in one direction in a mold. Preferably, after washed with an acid, the reduced silicon is heated and molten, and boron is added thereto. After the reduced silicon is heated and molten under reduced pressure, boron is added thereto. After heated and molten, the reduced silicon is purified by solidification in one direction, then heated and molten, and thereafter boron is added thereto.

5 Claims, 3 Drawing Sheets

[Fig.1]
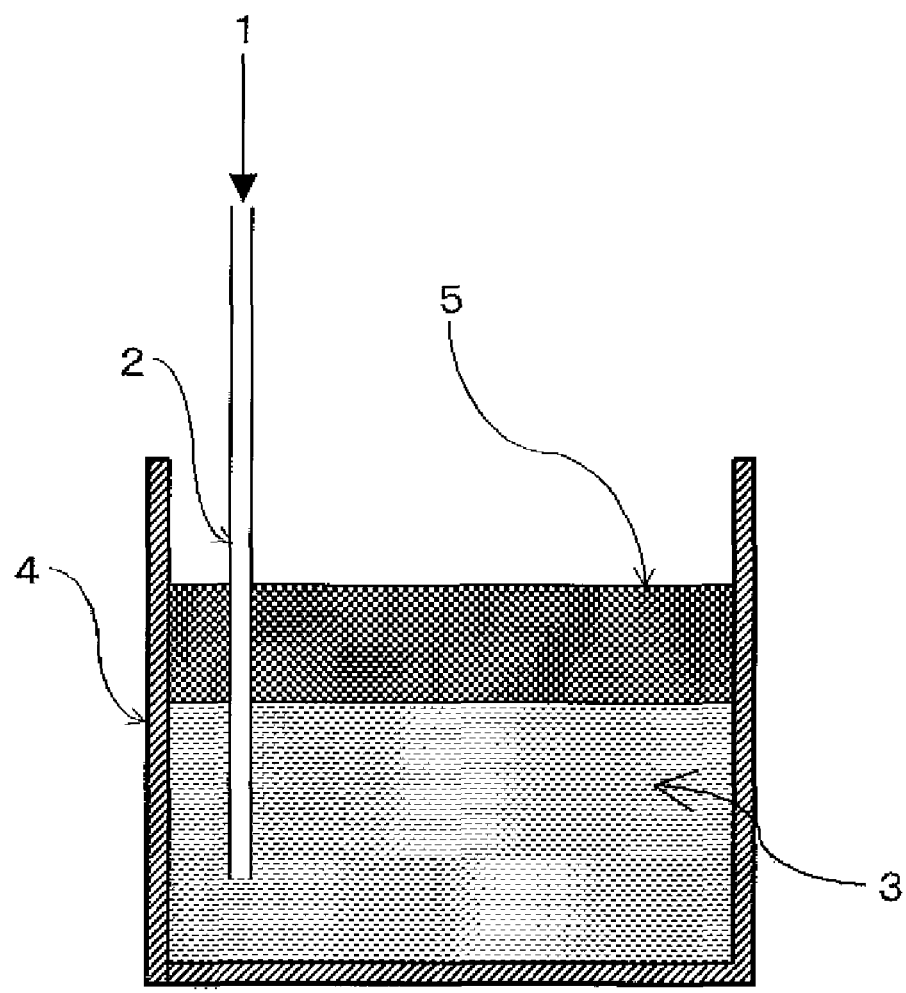

[Fig.2]
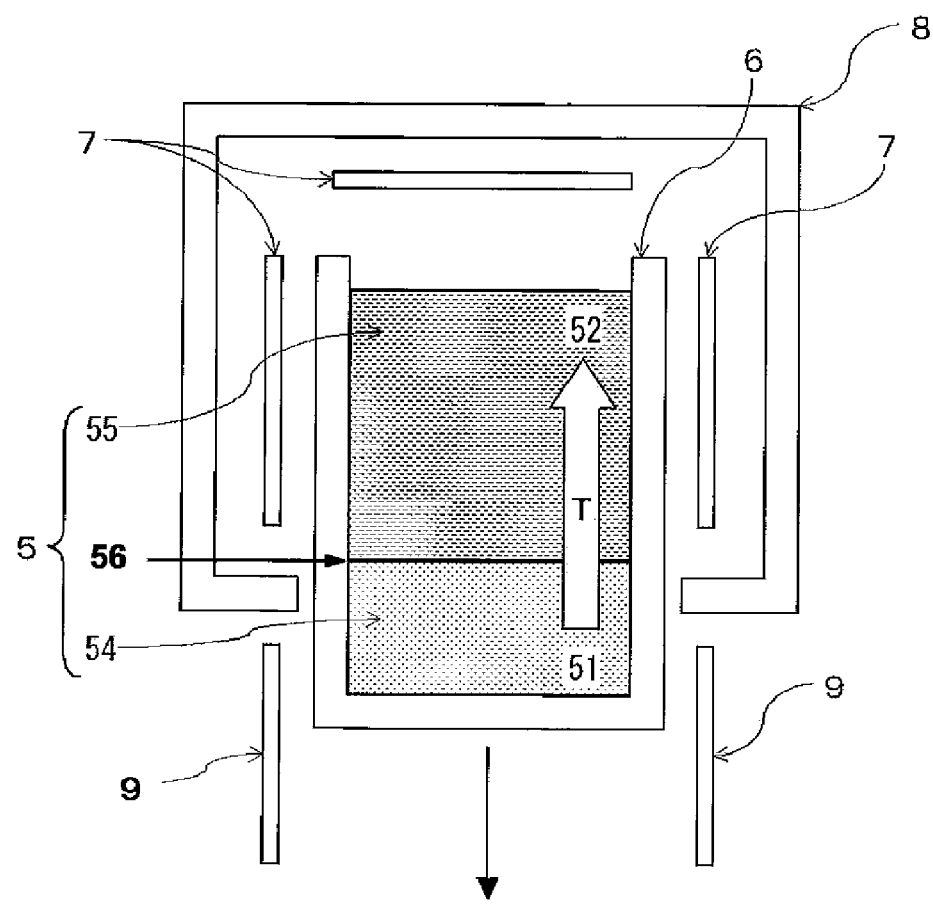

[Fig.3]
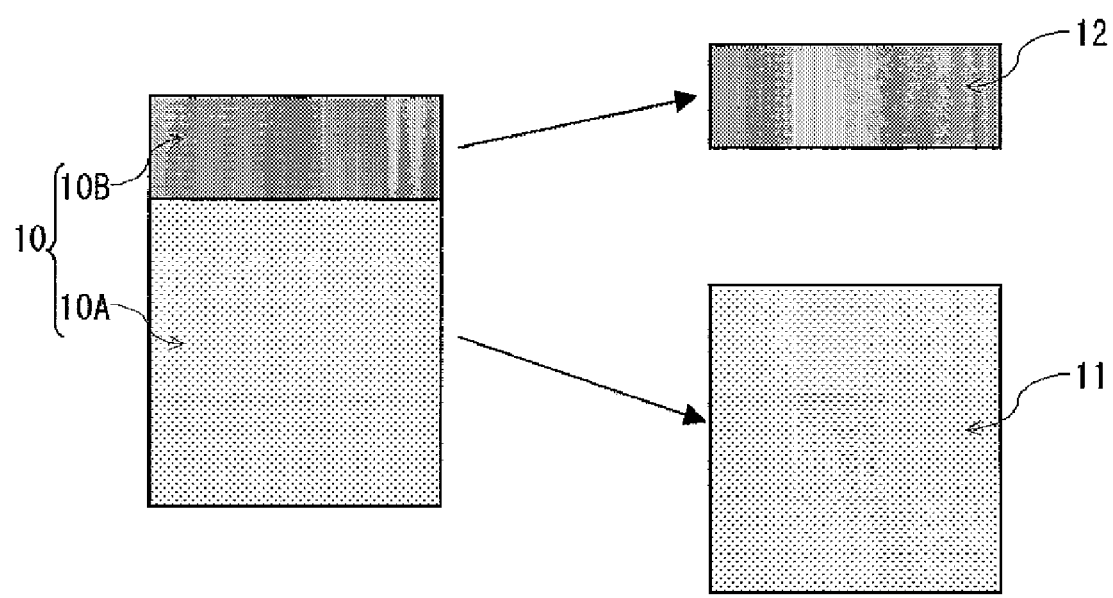

US 8,187,564 B2

PROCESS FOR PRODUCING BORON ADDED PURIFIED SILICON

TECHNICAL FIELD OF THE INVENTION

The present invention relates to a process for producing a boron added purified silicon, and precisely to a process comprising reducing a silicon halide with a metal aluminium to give a reduced silicon followed by adding boron to the reduced silicon to produce a purified silicon.

RELATED ART

A boron added purified silicon is useful as a material for solar cells. Such a purified silicon can be produced by adding boron to a heated and molten silicon.

On the other hand, for producing silicon, known is a process of reducing a silicon halide with a metal aluminium [Patent Document 1: JP-A 2-64006]. The reduced silicon produced according to such a process contains much aluminium as an impurity, and aluminium should be removed. In general, the obtained reduced silicon is molten under heat, solidified in a mold under the condition of a temperature gradient provided in one direction, and then the region containing a relatively larger amount of aluminium is removed. The reduced silicon is purified according to such a directional solidification process, and then used as a material for solar cells.

However, for adding boron to the silicon purified according to the directional solidification process, the purified silicon must be again heated and molten, which consumes much energy.

DISCLOSURE OF THE INVENTION

Accordingly, the present inventors have diligently studied for the purpose of developing a process for producing a boron added silicon in an energy saving mode from a reduced silicon obtained by reducing a silicon halide with a metal aluminium. As a result, the inventors have found that, even when boron is added to a heated and molten silicon and then the silicon is solidified in one direction, the added boron is uniformly distributed in the solidified silicon. Accordingly, the inventors have found that, when a reduced silicon is heated and molten and then boron is added thereto to form molten mixture containing silicon, aluminium and boron, and thereafter this is solidified in one direction and purified, then a boron added silicon can be produced, and have reached the present invention.

Specifically, the invention provides a process for producing a boron added silicon, wherein:

a silicon halide is mixed with a metal aluminium to reduce the silicon halide to produce a reduced silicon, the reduced silicon is heated and molten, and boron is added thereto, and then the reduced silicon is solidified in a mold under the condition of a temperature gradient provided in one direction to produce a purified silicon.

According to the production process of the invention, a reduced silicon is heated and molten, and, after boron is added thereto, solidified in one direction and purified; and therefore, as compared with a conventional process comprising solidifying a reduced silicon in one direction, purifying and again heating and melting the silicon and thereafter adding boron thereto, the production process of the invention does not require again heating and melting the reduced silicon and can produce a boron added silicon with low energy.

BRIEF DESCRIPTION OF THE DRAWINGS

[FIG. 1] an outline view showing a step of reducing a silicon halide with a metal aluminium.

[FIG. 2] an outline view showing a step of solidifying a reduced silicon according to a directional solidification process.

[FIG. 3] a schematic view showing a step of obtaining a boron added silicon from the directional solidified silicon obtained according to the directional solidification process.

BEST MODE FOR CARRYING OUT THE INVENTION

According to the production process of the invention, a silicon halide is first reduced with a molten metal aluminium to obtain a reduced silicon.

The silicon halide is, for example, a compound represented by a formula (1):

$$SiH_nX_{4-n} \qquad (1)$$

[wherein n indicates an integer of from 0 to 3; and X represents a halogen atom].

The halogen atom represented by X in the formula (1) includes a fluorine atom, a chlorine atom, a bromine atom, and an iodine atom. The silicon halide compound (I) includes, for example, silicon tetrafluoride, silicon trifluoride, silicon difluoride, silicon monofluoride, silicon tetrachloride, silicon trichloride, silicon dichloride, silicon monochloride, silicon tetrabromide, silicon tribromide, silicon dibromide, silicon monobromide, silicon tetraiodide, silicon triiodide, silicon diiodide, silicon monoiodide, etc.

The silicon halide (I) preferably has a purity of at least (not less than) 99.99% by mass, more preferably at least 99.9999% by mass, even more preferably at least 99.99999% by mass from the viewpoint of obtaining a boron added silicon having a high purity. In case where the obtained solid silicon is used as a material for solar cells, the silicon halide (I) having a smaller phosphorus content is preferably used, concretely having a phosphorus content of at most 0.5 ppm, more preferably at most 0.3 ppm, even more preferably at most 0.1 ppm.

As the metal aluminium, usable is an electrolytically reduced aluminium generally available as a commercial product, as well as a high purity aluminium to be obtained by purifying an electrolytically reduced aluminium according to a segregation solidification process, a three-layer electrolytic method or the like. For obtaining a solid silicon contaminated little by impurities, preferably used is a high purity metal aluminium having a purity of at least (not less than) 99.9% by mass, more preferably at least 99.95% by mass. In this, the purity of metal aluminium is a purity thereof to be obtained by subtracting the total content of iron, copper, gallium, titanium, nickel, sodium, magnesium and zinc from the metal aluminium of 100% by mass; and the total content of those elements can be determined through glow discharge mass spectrometry. As the metal aluminium, also usable is a metal aluminium containing silicon in a relatively small content.

For reducing a silicon halide with a metal aluminium, for example, a silicon halide gas may be blown into a heated and molten metal aluminium.

The reference numerals and alphabets used in FIG. 1 to FIG. 3 are indicating as follows: The reference numeral 1 means a silicon halide gas; 2 means a blowing pipe; 3 means a molten metal aluminium; 4 means a container; 5 means a reduced silicon (51 is on a low temperature side; 52 is on a high temperature side); 6 means a mold; 7 means a heater; 8 means a furnace; 9 means a water cooling plate; 10 means a directional solidified silicon (10A is a purified silicon region; 10B is a crude silicon region); 11 means a boron added silicon; 12 means a crude silicon. The reference sign T means a temperature gradient and R means a solidification speed.

A silicon halide is generally gaseous. As in FIG. 1, a silicon halide gas (1) is blown into a heated and molten metal aluminium (3), through the blowing pipe (2). As the blowing pipe (2), generally used is one inactive to the molten metal aluminium (3) and resistant to heat, concretely one composed of carbon such as graphite, or silicon carbide, nitrogen carbide, alumina (aluminium oxide), silica (silicon oxide) such as quartz, or the like.

As the container (4) to keep the molten metal aluminium (3) therein, generally used is one inactive to the heated and molten metal aluminium, the silicon halide gas (1) and silicon and resistant to heat, concretely one composed of carbon such as graphite, or silicon carbide, nitrogen carbide, alumina (aluminium oxide), silica (silicon oxide) such as quartz, or the like.

By blowing a silicon halide gas (1) into the molten metal aluminium (3), the silicon halide (1) is reduced with the molten metal aluminium (3) and the formed silicon is dissolved in the metal aluminium to give a silicon containing molten metal aluminium (3).

The silicon content in the molten metal aluminium (3) may be controlled by the amount of the blowing silicon halide gas (1).

By cooling the molten metal aluminium (3) after blowing of the silicon halide gas (1) thereinto, the silicon dissolved in the melt is crystallized out as a reduced silicon (5). The crystallized reduced silicon (5) is cut out of the solid after cooled, thereby giving the intended reduced silicon (5).

The purity of the obtained reduced silicon (5) is generally at least (not less than) 99.9% by mass, preferably at least 99.99% by mass; and the aluminium content is preferably at most 1100 ppma (parts per million atomic) as an atomic ratio to silicon, more preferably at most 12 ppma, even more preferably at most 10 ppma. The boron content is preferably at most 0.3 ppma as an atomic ratio to silicon, more preferably at most 0.03 ppma. The carbon content is preferably at most 17 ppma, more preferably at most 2 ppma. The reduced silicon (5) having such a purity can be obtained, for example, by cooling the molten aluminium (3) at a low cooling speed.

Next, the obtained reduced silicon (5) is heated and molten. However, a relatively large amount of a metal aluminium may adhere to the surface of the reduced silicon (5). Depending on the purity of the silicon halide (1) and the molten metal aluminium (3) used, the obtained reduced silicon (5) may contain a relatively large amount of impurities. In such cases, preferably, the reduced silicon (5) is washed with an acid and then heated and molten from the viewpoint of removing the impurities such as aluminium.

Acid washing of the reduced silicon (5) may be attained, for example, by dipping the reduced silicon (5) in an acid. The acid for use for the acid washing includes, for example, concentrated nitric acid, concentrated hydrochloric acid, aqua regia (nitrohydrochloric acid) and the like. The acid washing temperature may be generally from 20° C. to 90° C. The acid washing time may be generally from 5 hours to 24 hours, preferably at most 12 hours.

The reduced silicon (5) may be heated and molten under atmospheric pressure, but it is preferably heated and molten under reduced pressure from the viewpoint of evaporating and removing the volatile impurity elements. The pressure (absolute pressure) in heating and melting under reduced pressure may be generally at most 400 Pa, preferably at most 50 Pa, more preferably at most 5 Pa, especially preferably at most 0.5 Pa.

The heating temperature in heating and melting the reduced silicon (5) is not lower than the melting temperature of silicon material, generally from 1410° C. to 1600° C.

Next, boron (e.g., $B_{12}$ or $B_{84}$) is added to the heated and molten, reduced silicon (5). The amount of boron to be added may be suitably determined depending on the boron content originally in the reduced silicon (5) and the intended boron content in the purified silicon. In case where the reduced silicon is used, for example, as a material for solar cells, the boron amount may be generally from 0.03 ppma to 2 ppma in terms of parts by million atomic (ppma) as an atomic ratio to the silicon element, preferably from 0.1 ppma to 0.6 ppma.

As in FIG. 2, according to the production process of the invention, a reduced silicon (5) in a heated and molten condition after boron has been added thereto is solidified in the mold (6) under the condition of a temperature gradient (T) provided in one direction, according to a so-called directional solidification process.

The molten reduced silicon (5) is cooled under the condition of a temperature gradient (T) given to the molten reduced silicon (5) in one direction thereof. The temperature gradient (T) may be provided in one direction, and the temperature gradient (T) may be provided in a horizontal direction so that the low temperature side (51) and the high temperature side (52) could be on the same level; or may be in a gravity direction so that the low temperature side (51) could be the top and the high temperature side (52) could be the bottom. In general, as in FIG. 2, the temperature gradient (T) is provided in a gravity direction so that the low temperature side (51) could be the bottom and the high temperature side (52) could be the top. As not requiring any unreasonable equipment and as being practicable, the temperature gradient (T) is generally from 0.2° C./mm to 2.5° C./mm, preferably from 0.5° C./mm to 1.5° C./mm.

The temperature gradient (T) may be provided, for example, according to a process of heating the upper part of the mold (6) in a furnace (8) equipped with a heater (7) and kept open to air at the bottom thereof, with the heater (7), while cooling the lower part of the mold below the furnace (8). For cooling the lower part of the mold (6), applicable is an air cooling method; however, depending on the temperature gradient (T), for example, a water cooling plate (9) may be disposed below the furnace (8), and heat removal and cooling may be attained by the water cooling plate (9).

In general, for example, the reduced silicon (5) can be cooled by moving the mold (6) containing the silicon therein in the downward direction and leading the mold out of the furnace (8) from its lower part. The reduced silicon (5) is cooled in that manner, whereby the reduced silicon (5) can solidify with forming a solid phase (54) from the low temperature side (51), thereby giving a directional solidified silicon.

The solidification speed (R) represented by the moving speed of the boundary (56) between the solid phase (54) formed from the low temperature side (51) by cooling and the liquid phase (55) not as yet solidified on the high temperature side (52) may be generally from 0.05 mm/min to 2 mm/min, preferably from 0.5 mm/min to 1.2 mm/min. The solidification speed (R) may be controlled, for example, by controlling the moving speed of the mold (6) at the time when the mold (6) is moved out of the furnace (8).

In the manner as above, the reduced silicon (5) gradually solidifies from the low temperature side (51) thereof. The degree of solidification fraction (Y) in the solidification process (solid proportion) is an index indicating the degree of solidification progress, and is represented by the proportion (%) of the solid phase (54) formed to the reduced silicon (5) used. For example, the solidification fraction (Y) at the solidification start site is 0 (%), and the solidification fraction (Y) at the solidification end site is 100 (%), and the solidification fraction (Y) increases along the solidification direction.

In the process of solidifying the reduced silicon (5) by cooling in that manner, the impurities such as aluminium in the reduced silicon (5) move to the high temperature side (52) through segregation. Accordingly, in the directional solidified silicon (10) after solidification, the impurity content (C) increases in one direction from the low temperature side (51) toward the high temperature side (52) of the temperature gradient (T).

On the other hand, boron does not almost segregate on the high temperature side (52), but is distributed at an almost constant concentration in the solid phase (55) and the liquid phase (54) of the reduced silicon (5).

As shown in FIG. 3, of the obtained directional solidified silicon (10), the region on the low temperature side (51) of the temperature gradient (T) in the cooling process is to be a purified silicon region (10A) having a lower impurity content, while the region on the high temperature side (52) is to be a crude silicon region (10B) containing a larger amount of segregated impurities. Of the directional solidified silicon (10), the crude silicon region (10B) is cut off to thereby give the intended boron added silicon (11), or that is, purified silicon as the purified silicon region (10A). The method of cutting off the crude silicon region (10B) is not specifically defined. For example, the region may be cut off according to an ordinary method of using a diamond cutter or the like, to thereby remove the crude silicon region (10B) as a crude silicon (12).

The obtained boron added silicon (11) is useful, for example, as a material for solar cells.

As the case may be, after purified according to a directional solidification process, the reduced silicon (5) may be again heated and molten and then boron may be added thereto.

EXAMPLE

The invention is described in more detail with reference to the following Examples; however, the invention should not be limited by these Examples.

Example 1

As shown in FIG. 1, a silicon halide gas (1), which is silicon tetrachloride gas was blown into a molten metal aluminium (3) in a heated and molten condition at 1020° C., through the blowing pipe (2), and reduced, and then, the molten metal aluminium (3) was cooled, and the crystallized reduced silicon (5) was cut out. The aluminium content in the reduced silicon (5) was quantitatively determined through Inductively Coupled Plasma Mass Spectrometry (ICPMS), and was 1100 ppma as an atomic ratio to the silicon element.

The reduced silicon (5) was dipped in concentrated hydrochloric acid [36% hydrochloric acid] at 80° C. for 8 hours for acid washing therein. The aluminium content and the phosphorus and boron content in the reduced silicon (5) after the acid washing were quantitatively determined through ICP mass spectrometry. The aluminium content was 10.3 ppma as an atomic ratio to the silicon element; the phosphorus content was 0.1 ppma, and the boron content was less than 0.03 ppma (lowermost detection limit).

The acid washed reduced silicon (5) was put into the mold (6) in the furnace (8) shown in FIG. 2, and heated and molten at 1510° C. In that condition, the silicon was kept under reduced pressure of 1 Pa (absolute pressure) for 12 hours. Afterwards, while the heated and molten condition of the reduced silicon (5) was kept as such, argon gas was introduced into the furnace (8) to make atmospheric pressure, and boron was added to be 0.3 ppma as an atomic ratio to the silicon element. Next, according to a directional solidification process of moving the mold (6) under the condition of a temperature gradient (T) of 1° C./mm and a solidification speed (R) of 0.4 mm/min, the reduced silicon (5) was solidified in one direction to give a directional solidified silicon (10). Of the obtained directional solidified silicon (10), the part corresponding to the boundary (56) between the liquid phase (54) and the solid phase (55) having a solidification fraction (Y) of 20%, 50% and 70% was cut out, and the aluminium, phosphorus and boron content in each part was quantitatively determined through ICP mass spectrometry, and the found data are as in Table 1 below.

TABLE 1

| Degree of Solidification (%) | Aluminium (ppma) | Phosphorus (ppma) | boron (ppma) |
| --- | --- | --- | --- |
| 20 | 0.05 | 0.03 | 0.22 |
| 50 | 0.07 | 0.05 | 0.23 |
| 70 | 0.14 | 0.06 | 0.25 |

The obtained directional solidified silicon (10) was cut at the part corresponding to the boundary (56) having a solidification fraction (Y) of 70% to remove the crude silicon region (10B), whereby the intended boron added silicon (11) was obtained as a purified silicon region (10A).

Comparative Example 1

A reduced silicon (5) obtained in the same manner as in Example 1 was put into the mold (6) in the furnace (8) shown in FIG. 2, then heated and molten at 1540° C., and according to a directional solidification process of moving the mold (6) under the condition of a temperature gradient (T) of 1° C./mm and a solidification speed (R) of 0.2 mm/min, the reduced silicon (5) was solidified in one direction to give a directional solidified silicon (10). Of the obtained directional solidified silicon (10), the crude silicon region (10B) was cut off at the part corresponding to the boundary (56) having a solidification fraction (Y) of 70% to thereby purify the reduced silicon (5). The aluminium, boron and phosphorus content in the purified reduced silicon (5) obtained as a purified silicon region (10A) was quantitatively determined through ICP mass spectrometry. The aluminium content was 6.2 ppma, the phosphorus content was 0.08 ppma, and the boron content was less than 0.03 ppma (lowermost detection limit).

Example 2

The reduced silicon (5) purified in the above was put into the mold (6) in the furnace (8) shown in FIG. 2, and heated and molten at 1540° C.; and boron was added thereto to be 0.3 ppma as an atomic ratio to the silicon element. Next, according to a directional solidification process of moving the mold (6) under the condition of a temperature gradient (T) of 1° C./mm and a solidification speed (R) of 0.2 mm/min, the reduced silicon (5) was solidified in one direction to give a directional solidified silicon (10). Of the obtained directional solidified silicon (10), the part corresponding to the boundary (56) having a solidification fraction (Y) of 20%, 50% and 70% was cut out, and the aluminium, phosphorus and boron content in each part was quantitatively determined through ICPMS, and the found data are as in Table 2 below.

TABLE 2

| Degree of Solidification (%) | Aluminium (ppma) | Phosphorus (ppma) | boron (ppma) |
|---|---|---|---|
| 20 | 0.05 | 0.03 | 0.22 |
| 50 | 0.08 | 0.04 | 0.23 |
| 70 | 0.16 | 0.06 | 0.25 |

The obtained directional solidified silicon (10) was cut at the part corresponding to the boundary (56) having a solidification fraction (Y) of 70% to remove the crude silicon region (10B), whereby the intended boron added silicon (11) was obtained as a purified silicon region (10A).

The invention claimed is:

1. A process for producing a purified silicon, comprising:
a step of reducing a silicon halide with a molten aluminum metal to produce a mixture comprising an aluminum metal and a reduced silicon,
a step of heating and melting the reduced silicon,
a step of forming a molten mixture containing silicon, aluminium and boron by adding boron to the molten reduced silicon,
a step of solidifying the molten mixture under the condition of a temperature gradient provided in one direction in a mold, and
a step of cutting off a crude silicon region from an obtained directional solidified silicon.

2. The production process according to claim 1, wherein the reduced silicon is washed with an acid before the step of heating and melting the reduced silicon.

3. The production process according to claim 1, wherein the reduced silicon is heated and molten under reduced pressure in the step of heating and melting the reduced silicon.

4. The production process according to claim 2, wherein the reduced silicon is heated and molten under reduced pressure in the step of heating and melting the reduced silicon.

5. The production process according to claim 1, wherein the purified silicon is further heated and molten, and boron is added thereto.

* * * * *